(12) United States Patent
Zhang et al.

(10) Patent No.: US 10,770,728 B2
(45) Date of Patent: Sep. 8, 2020

(54) ANODE MATERIAL HAVING POROUS CORE-SHELL STRUCTURE AND METHOD OF PREPARING THE SAME AND BATTERY

(71) Applicant: BYD COMPANY LIMITED, Shenzhen, Guangdong (CN)

(72) Inventors: Kai Zhang, Shenzhen (CN); Huiquan Liu, Shenzhen (CN)

(73) Assignee: BYD COMPANY LIMITED, Shenzhen (CN)

( * ) Notice: Subject to any disclaimer, the term of this patent is extended or adjusted under 35 U.S.C. 154(b) by 249 days.

(21) Appl. No.: 15/874,276

(22) Filed: Jan. 18, 2018

(65) Prior Publication Data

US 2018/0145327 A1    May 24, 2018

Related U.S. Application Data

(63) Continuation of application No. PCT/CN2016/098421, filed on Sep. 8, 2016.

(30) Foreign Application Priority Data

Sep. 30, 2015 (CN) .......................... 2015 1 0641136

(51) Int. Cl.
*H01M 4/583* (2010.01)
*H01M 10/0525* (2010.01)
*H01M 4/36* (2006.01)
*H01M 4/587* (2010.01)
*H01M 4/62* (2006.01)
*H01M 4/38* (2006.01)
(Continued)

(52) U.S. Cl.
CPC .......... *H01M 4/583* (2013.01); *H01M 4/366* (2013.01); *H01M 4/387* (2013.01); *H01M 4/52* (2013.01); *H01M 4/587* (2013.01); *H01M 4/625* (2013.01); *H01M 10/052* (2013.01); *H01M 10/0525* (2013.01); *H01M 2004/021* (2013.01); *H01M 2004/027* (2013.01)

(58) Field of Classification Search
None
See application file for complete search history.

(56) References Cited

U.S. PATENT DOCUMENTS

2004/0214087 A1* 10/2004 Sheem .............. C04B 35/62839
429/231.8

FOREIGN PATENT DOCUMENTS

| CN | 102082262 A | 6/2011 |
|---|---|---|
| CN | 103112846 A | 5/2013 |

(Continued)

OTHER PUBLICATIONS

International Search Report and Written Opinion for Application No. PCT/CN2016/098421, dated Dec. 9, 2016, 8 pages.

*Primary Examiner* — Tracy M Dove

(57) ABSTRACT

The present disclosure relates to an anode material having porous core-shell structure, the anode material includes a core formed of at least one carbonaceous material selected from a group consisting of graphite, hard carbon and soft carbon, and a carbon shell coated on a surface of the core. The carbon shell contains amorphous carbon, cobalt element and tin element, and has a porous structure having a porosity greater than 10%. The present disclosure further relates to a method of preparing the anode material having porous core-shell structure, and a battery of which a negative electrode contains the anode material having porous core-shell structure.

18 Claims, 1 Drawing Sheet

(51) Int. Cl.
  *H01M 4/52*    (2010.01)
  *H01M 10/052*  (2010.01)
  *H01M 4/02*    (2006.01)

(56) References Cited

FOREIGN PATENT DOCUMENTS

| CN | 103367721 A | * | 10/2013 |
| CN | 103855368 A | * | 6/2014 |
| CN | 105449182 A | * | 3/2016 |

* cited by examiner

ANODE MATERIAL HAVING POROUS CORE-SHELL STRUCTURE AND METHOD OF PREPARING THE SAME AND BATTERY

CROSS-REFERENCE TO RELATED APPLICATIONS

This application is a continuation application of International Application No. PCT/CN2016/098421, filed on Sep. 8, 2016, which is based on and claims priority to and benefits of Chinese Patent Application No. 201510641136.5, filed with the State Intellectual Property Office (SIPO) of the People's Republic of China on Sep. 30, 2015. The entire contents of the above-identified application is incorporated herein by reference.

FIELD

Embodiments of the present disclosure generally relate to an anode material having porous core-shell structure and method of preparing the same and battery.

BACKGROUND

In related technology of preparing a complex of mesoporous carbon ball and Sn—Co, the Sn anode material coated with mesoporous carbon obtained has a low porosity, and a pore size is small, which cannot well ease the problem of volume expansion of the anode material during charging and discharging, and then the battery obtained could not achieve a good electrical cycle performance. The Sn anode material coated with mesoporous carbon may have many side effects and an initial charge-discharge efficiency may be relatively low.

SUMMARY

The present disclosure seeks to provide an anode material having porous core-shell structure and method of preparing the same and a battery, such that volume expansion of anode material during charging and discharging may be well prevented so as to obtain a relatively better electrical cycle performance.

Thus, embodiments of a first aspect of the present disclosure provide an anode material having porous core-shell structure, the anode material includes: a core formed of at least one carbonaceous material selected from a group consisting of graphite, hard carbon and soft carbon, and a carbon shell coated on a surface of the core, the carbon shell contains amorphous carbon, cobalt element and tin element, and has a porous structure having a porosity greater than 10%.

Embodiments of a second aspect of the present disclosure further provide a method of preparing an anode material having porous core-shell structure, which includes steps of:

dispersing a calcium carbonate and/or a calcium oxalate and at least one carbonaceous material selected from a group consisting of graphite, hard carbon and soft carbon into a first solution containing cobalt compound and tin compound to obtain a dispersion solution, and introducing precipitant into the dispersion solution to carry out precipitating, and obtaining a first solid phase after solid-liquid separation;

dispersing the first solid phase into a second solution containing carbon source material, and obtaining a second solid phase after removing solvent; and subjecting the second solid phase to a high temperature decomposition treatment in inert atmosphere.

Embodiments of a third aspect of the present disclosure further provide an anode material having porous core-shell structure prepared via the method mentioned above.

Embodiments of a fourth aspect of the present disclosure further provide a battery, of which a negative electrode contains the anode material having porous core-shell structure mentioned above.

Advantageous effects of the technology solution of the present disclosure may be: the anode material having porous core-shell structure may prevent the volume expansion during charging and discharging, and then a negative electrode made of the anode material having porous core-shell structure of the present disclosure may improve an electrical cycle performance of the battery obtained.

These and other aspects and advantages of embodiments of the present disclosure will be described in detail with reference to the following detailed description.

BRIEF DESCRIPTION OF THE DRAWINGS

The drawings are used for further comprehending the present disclosure, it should constitute as one part of the description, and be used to explain the present disclosure together with the detailed description, however it should not be constructed as limit to the present disclosure.

DETAILED DESCRIPTION

Figure 1:
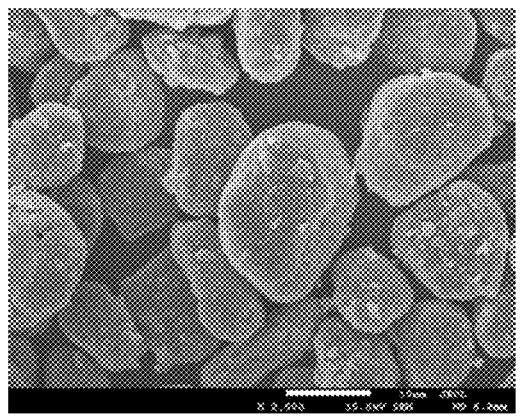
FIG. 1 is a field emission scanning electron micrograph of an anode material obtained in Embodiment 1 of the present disclosure.

Reference will be made in detail to embodiments of the present disclosure. The embodiments described herein are explanatory and illustrative, which are used to generally understand the present disclosure. The embodiments shall not be construed to limit the present disclosure.

According to a first aspect of embodiments of the present disclosure, the present disclosure provides an anode material having porous core-shell structure, the anode material includes a core formed of at least one carbonaceous material selected from a group consisting of graphite, hard carbon and soft carbon, and a carbon shell coated on a surface of the core. The carbon shell contains amorphous carbon, cobalt element and tin element, and has a porous structure having a porosity greater than 10%.

In some embodiments of the present disclosure, the anode material includes a core and a carbon shell. The core is formed from at least one carbonaceous material (for example, graphite), while the carbon shell is formed from amorphous carbon. The amorphous carbon may be usually obtained via high temperature carbonization of some carbon source material (see below for detailed description). The carbon shell has a porous structure, which may reserve enough space for volume expansion and shrinkage of the anode material during intercalation/de-intercalation of lithium so as to avoid constantly bursting and generating of a SEI film (solid electrolyte interface film) caused by volume varies of the anode material during charging and discharging, such that a recycle performance of a battery may be improved. In some embodiments of the present disclosure, the carbon shell has a porosity greater than 10%, for example the carbon shell has a porosity of about 10% to about 30%. The porosity means a percentage of a pore volume in a total volume of the carbon shell.

In some embodiments of the present disclosure, a pore diameter of the porous structure is about 50 nanometers to about 150 nanometers. Therefore, the anode material of these embodiments may provide a carbon shell with higher porosity and greater pore diameter, which may be compatible with a charge and discharge performance of graphite of the core better, and then the anode material may have higher specific capacity (both a volumetric specific capacity and a mass specific capacity are improved).

In some embodiments of the present disclosure, the cobalt element and tin element are dispersed into the carbon shell. The tin element may be interpreted as an active metal component of the anode material, which could improve a theoretical specific capacity of the battery, while the existence of cobalt element may ease the effect of volume expansion well. Under the condition that the carbon shell has a porous structure, the battery obtained may not only have a relatively high capacity, but also the effect of easing volume expansion of negative electrode of the battery may be better, and then the battery obtained may have a better recycle performance. In some embodiments of the present disclosure, a weight ratio of cobalt element, tin element to carbon element of the carbon shell is about 1:2-4:4-8.

In some embodiments of the present disclosure, the cobalt element and the tin element are presented in the carbon shell in a form of tin cobalt alloy particle, and the tin cobalt alloy particle has a particle diameter of about 30 nanometers to about 70 nanometers. In some embodiments of the present disclosure, the tin cobalt alloy particle is at least one selected from a group consisting of CoSn, $CoSn_2$, and $Co_3Sn_2$. However, the present disclosure does not exclude other situation, for example, the cobalt element and the tin element are presented in the carbon shell in a form of cobalt oxide particle and tin oxide particle respectively. In some other embodiments, the cobalt oxide particle is a nano cobalt oxide particle having a particle diameter of about 20 nanometers to about 50 nanometers (for example, about 20 nanometers to about 40 nanometers), and the tin oxide particle is a nano tin oxide particle having a particle diameter of about 30 nanometers to about 80 nanometers (for example, about 30 nanometers to about 60 nanometers).

In some embodiments of the present disclosure, the porous structure of the carbon shell is formed in a manner of restoration pore. Specifically, a calcium oxide and a carbon dioxide are obtained through decomposing on a pore structure foundation. The pore structure foundation is formed via decomposed carbide of a carbon source material which forms the carbon shell. As more and larger pores may be formed due to an escape of the carbon dioxide, and larger through pores may be formed especially after washing out the calcium oxide obtained from decomposing a calcium carbonate and/or a calcium oxalate, the porous structure can be formed in the carbon shell. It should be noted that the present disclosure does not exclude a situation that a portion of calcium element (including in at least one form of calcium carbonate, calcium oxalate and calcium oxide) may be reserved in the carbon shell. In some embodiments of the present disclosure, the carbon shell contains calcium element less than 0.01 wt % (based on a total weight of the carbon shell).

In some embodiments of the present disclosure, the carbon shell further includes an addition agent, for example, the carbon shell further includes at least one selected from a group consisting of carbon nano tube, acetylene black and graphene, which may improve stability and conductivity of the shell. In some embodiments of the present disclosure, the addition agent has a content less than 30 wt % (based on a total weight of the carbon shell).

In some embodiments of the present disclosure, a weight ratio of carbon element of the carbon shell to the core is about 1-2:10, and the anode material obtained may have better recycle performance.

In some embodiments of the present disclosure, the core includes a graphite having a particle diameter of about 8 microns to about 18 microns (for example, a spheroidal-graphite having a particle diameter of about 8 microns to about 18 microns). In some embodiments of the present disclosure, under the condition that satisfies the weight ratio of the carbon element of the carbon shell to the core, a thickness of the carbon shell could be about 0.2 microns to about 2 microns, such that the anode material obtained may have a size distribution D50 of about 8 microns to about 20 microns.

According to embodiments of the present disclosure, the anode material having porous structure may have relatively better electrical performance. Specifically, through button battery test method, under 25 Celsius degrees, a weight ratio intercalation capacity is about 420 mAh/g to about 440 mAh/g, and a weight ratio de-intercalation capacity is about 365 mAh/g to about 380 mAh/g. After 50 times of recycle, a retention rate of weight ratio capacity may be greater than 79% (for example, greater than 84%).

According to a second aspect of embodiments of the present disclosure, the present disclosure provides a method of preparing an anode material having porous core-shell structure, the method comprising steps of:

dispersing a calcium carbonate and/or a calcium oxalate and at least one carbonaceous material selected from a group consisting of graphite, hard carbon and soft carbon into a first solution containing cobalt compound and tin compound to obtain a dispersion solution, and introducing precipitant into the dispersion solution to carry out precipitating, and obtaining a first solid phase after solid-liquid separation;

dispersing the first solid phase into a second solution containing carbon source material, and obtaining a second solid phase after removing solvent; and treating the second solid phase with a high temperature decomposition treatment in inert atmosphere.

In some embodiments of the present disclosure, the calcium carbonate and/or the calcium oxalate and at least one carbonaceous material selected from a group consisting of graphite, hard carbon and soft carbon are dispersed into the first solution containing cobalt compound and tin compound so as to obtain a dispersion solution, and then the precipitant is utilized such that cobalt element and tin element could adhere to the carbonaceous material in a manner of generating a precipitate, therefore the precipitate containing cobalt element and tin element and the calcium carbonate and/or the calcium oxalate are adhered to a surface of the carbonaceous material, namely the first solid phase obtained.

In some embodiments of the present disclosure, a size of the calcium carbonate and/or the calcium oxalate and the carbonaceous material could vary in a relatively wide range, the size of the calcium carbonate and/or the calcium oxalate determines, to a great extent, the pore diameter of the carbon shell of the anode material obtained, and the size of the carbonaceous material determines, to a great extent, the size of the anode material obtained. In some embodiments of the present disclosure, the calcium carbonate is a nano-calcium carbonate particle having a particle diameter of about 40 nanometers to about 80 nanometers. In some embodiments of the present disclosure, the calcium oxalate is a nano-calcium oxalate particle having a particle diameter of about 40 nanometers to about 80 nanometers. In some embodiments of the present disclosure, the carbonaceous material includes a graphite, for example, a spherical graphite particle having a particle diameter of about 8 microns to about 18 microns.

In some embodiments of the present disclosure, the cobalt compound is at least one selected from a group consisting of cobalt dichloride, cobalt nitrate, cobaltous sulfate, cobaltous acetate and cobalt oxalate, while the tin compound is at least one selected from a group consisting of stannous monosulphate, stannous chloride, and C1-C4 alkyl sulfonate tin (for example, stannous methanesulfonate, tin ethyl sulfonate).

In some embodiments of the present disclosure, a ratio of the cobalt compound and the tin compound are determined such that a weight ratio of cobalt element, tin element to carbon element in the carbon shell is about 1:2-4:4-8. In some embodiments of the present disclosure, based on 100 weight parts of the carbonaceous material, a concentration of the cobalt compound calculated via the cobalt element is about 1 weight part to about 10 weight parts (for example, about 3 weight parts to about 6 weight parts), a concentration of the tin compound based calculated via the tin element is about 8 weight parts to about 30 weight parts (for example, about 12 weight parts to about 18 weight parts), and a concentration of the carbon source material is about 10 weight parts to about 40 weight parts (for example, 15 weight parts to about 30 weight parts). In some embodiments of the present disclosure, in the first solution containing cobalt compound and tin compound, the cobalt compound has a concentration of about 1 wt % to about 20 wt % (for example, about 1.5 wt % to about 3 wt %), while the tin compound has a concentration of about 3 wt % to about 36 wt % (for example, about 4 wt % to about 6 wt %).

In order to disperse the calcium carbonate and/or the calcium oxalate and the carbonaceous material in the first solution containing cobalt compound and tin compound well, in some embodiments of the present disclosure, the calcium carbonate and/or the calcium oxalate and the carbonaceous material are dispersed into the first solution containing cobalt compound and tin compound under the existence of a dispersant, the dispersant is at least one selected from a group consisting of polyvinylpyrrolidone, polyving akohol, polyethylene glycol, polyacrylamide and carboxymethylcellulose. In some embodiments of the present disclosure, based on 100 weight parts of the carbonaceous material, a concentration of the dispersant is about 10 weight parts to about 20 weight parts.

In some embodiments of the present disclosure, for example, the dispersion solution could be prepared by dispersing the calcium carbonate and/or the calcium oxalate and the carbonaceous material in the first solution containing cobalt compound and tin compound via stirring or ball-milling. In some embodiments of the present disclosure, the calcium carbonate and/or the calcium oxalate and the carbonaceous material are dispersed into the first solution containing cobalt compound and tin compound via ball-milling under a rotate speed of about 50 rpm to about 200 rpm (for example, about 50 rpm to about 100 rpm) for about 1 hour to about 5 hours (for example, about 1 hour to about 2 hours) to obtained the dispersion solution. In some embodiments of the present disclosure, the ball-milling is performed with a zirconium ball greater than 10 millimeters, such that the carbonaceous material may maintain its size.

In some embodiments of the present disclosure, the precipitant is at least one selected from a group consisting of ammonium bicarbonate, aqua ammonia, carbamide, sodium bicarbonate and potassium bicarbonate, such that the cobalt element and tin element provided by the cobalt compound and the tin compound respectively could adhere to the surface of the carbonaceous material in a form of precipitate. In some embodiments of the present disclosure, the precipitant is added into the dispersion solution in a form of precipitant solution, for example, the precipitant solution may be at least one selected from a group consisting of an ammonium bicarbonate solution having a concentration of about 15 g/L to about 35 g/L, an aqua ammonia having a concentration of about 8 g/L to about 16 g/L, and a carbamide solution having a concentration of about 20 g/L to about 30 g/L.

In order to sufficiently utilize the cobalt element and tin element provided by the cobalt compound and the tin compound respectively, in some embodiments of the present disclosure, the precipitation is carried out under a temperature of about 60 Celsius degrees to about 80 Celsius degrees for about 0.5 hours to about 3 hours. In some embodiments of the present disclosure, the precipitant solution is added in the dispersion solution via drop-adding method. When utilizing drop-adding method, the time of precipitating could be interpreted as a time including a time consumed during drop-adding, or the time of precipitating is the time consumed during drop-adding. Even though the cobalt element and tin element adhered to the surface of the carbonaceous material are basically in the form of precipitate of cobalt element (such as at least one of cobalt carbonate, cobalt carbonate and cobalt hydroxide) and precipitate of tin element (such as at least one of tin carbonate, alkaline tin carbonate and tin hydroxide), the present disclosure does not limit to this, it should be noted by those skilled in the art, the cobalt element and tin element adhered to the surface of the graphite particle could also be in the form of the cobalt compound and the tin compound.

In some embodiments of the present disclosure, after solid-liquid separation, the first solid phase could be obtained, in order to better disperse the first solid phase into the second solution containing carbon source material, the first solid phase obtained after solid-liquid separation is firstly dried (for example, dried under a temperature of about 30 Celsius degrees to about 60 Celsius degrees for about 5 hours to about 10 hours).

In some embodiments of the present disclosure, through dispersing the first solid phase into the second solution containing carbon source material, a carbonaceous material loaded with carbon source material may be obtained after removing solvent, then the carbon source material may be decomposed to generate elemental carbon after the high temperature decomposition treatment. The elemental carbon forms the carbon shell on the surface of the carbonaceous material which plays as the core. In some embodiments of the present disclosure, the carbon source material is at least one selected from petroleum asphalt, coal pitch, saccharose, glucose, starch, phenolic resin and epoxy resin. In some embodiments of the present disclosure, a ratio of the carbon source material and the carbonaceous material are determined such that a weight ratio of carbon element of the carbon shell to the core is about 1-2:10. Satisfying such weight ratio, a concentration described above of the carbon source material is adopted.

In order to disperse the first solid phase and the carbon source material well, in some embodiments of the present disclosure, the carbon source material is presented in a form of solution. In some embodiments of the present disclosure, a solvent of the solution of the carbon source material is at least one selected from a group consisting of naphthaline, acetone, carbon tetrachloride, ethyl alcohol and water. In some embodiments of the present disclosure, a content of the carbon source material in the solution of the carbon source material is about 3 wt % to about 20 wt %.

In some embodiments of the present disclosure, dispersing the first solid phase in the second solution containing carbon source material further includes introducing an addition agent during dispersing, such that the anode material obtained may have a better performance. In some embodiments of the present disclosure, the addition agent is at least one selected from a group consisting of carbon nano tube, acetylene black and graphene. In some embodiments of the present disclosure, for example, a concentration of the addition agent may be determined such that a content of the addition agent in the carbon shell of the obtained anode material is less than 30 wt %. In terms of satisfying such condition, for example, with respect to 100 weight parts of carbonaceous material, the concentration of the addition agent is less than 3 weight parts.

In some embodiments of the present disclosure, the first solid phase is dispersed into the second solution containing carbon source material under a temperature of about 80 Celsius degrees to about 100 Celsius degrees for about 0.5 hours to about 1 hour. The dispersion could be performed under stirring.

In some embodiments of the present disclosure, the method of removing the solvent includes: heating the second solution to about 210 Celsius degrees to about 230 Celsius degrees and dwelling for about 1 hour to about 3 hours, and then heating the second solution to about 250 Celsius degrees to about 280 Celsius degrees and dwelling for about 1 hour to about 3 hours.

In some embodiments of the present disclosure, a substance having a core and a carbon shell made of carbon source material is obtained after dispersing the first solid phase into the second solution containing carbon source material, and the carbon source material includes cobalt element, tin element and calcium carbonate and/or calcium oxalate and at least one carbonaceous material selected from a group consisting of graphite, hard carbon and soft carbon. While the purpose of high temperature decomposition treatment is to decompose the carbon source material into amorphous carbon, and decompose the calcium carbonate and/or the calcium oxalate into calcium oxide and carbon dioxide. The carbon shell of the anode material may be obtained during the process of decomposing the carbon material into amorphous carbon, a co-precipitate of cobalt element and tin element may basically be reduced by carbon so as to obtain tin cobalt alloy, and the releasing of carbon dioxide, which is obtained from the decomposition of the calcium carbonate and/or the calcium oxalate, may form through pores to some extent. In some embodiments of the present disclosure, the high temperature decomposition treatment is performed under a temperature of about 850 Celsius degrees to about 1050 Celsius degrees for about 2 hours to about 6 hours. In some other embodiments of the present disclosure, the high temperature decomposition treatment is performed by heating the second solid phase to about 300 Celsius degrees to about 500 Celsius degrees with a heating rate of about 2 Celsius degrees per minute to about 5 Celsius degrees per minute and dwelling for about 2 hours to about 4 hours, and then heating the second solid phase to about 950 Celsius degrees to about 1050 Celsius degrees with a heating rate of about 5 Celsius degrees per minute to about 10 Celsius degrees per minute and dwelling for about 3 hours to about 6 hours.

In some embodiments of the present disclosure, the inert atmosphere is at least one selected from a group consisting of nitrogen, argon and helium gas. In order to maintain the inert atmosphere well and make the high temperature decomposition treatment more efficiently, in some embodiments of the present disclosure, prior to the high temperature decomposition treatment, an inactive gas is introduced for about 2 to about 5 hours so as to make a content of oxygen is less than 50 ppm, and during the process of high temperature decomposition treatment, an inactive gas is continually introduced at a rate of 0.2-0.5 $m^3$/h.

In some embodiments of the present disclosure, in order to obtain an anode material with better performance, the method of the present disclosure further includes a step of washing a third solid phase obtained after the high temperature decomposition treatment. In some embodiments of the present disclosure, for example, the calcium oxide obtained from the decomposition of the calcium carbonate and/or the calcium oxalate may be washed out through the washing step, such that the position occupied by the calcium carbonate and/or the calcium oxalate forms a pore, therefore, the carbon shell obtained may have a more suitable porous structure.

As illustrated above, the main purpose of the washing step is to remove the calcium oxide obtained from the decomposition of the calcium carbonate and/or the calcium oxalate. In some embodiments of the present disclosure, the third solid phase obtained after the high temperature decomposition treatment is introduced in water (for example, deionized water), a ratio of which is determined such that a solid-to-liquid ratio (mass ratio) is about 1:5-10 (in each time of washing), with stirring and washing for about 1 to 3 hours. The washing step may be repeated for about 3 to 4 times, and then the solid phase obtained is dried to obtain the abode material having porous structure of the present disclosure. It should be understood that, even though the purpose of the washing step is to remove the calcium oxide, the anode material of the present disclosure may be an anode material in which the calcium carbonate and/or calcium oxalate are totally decomposed and the calcium oxide is totally removed, or an anode material in which part of the calcium carbonate and/or calcium oxalate are not decomposed and part of the calcium oxide is retained. For example, a content of calcium, because of residual of the calcium carbonate and/or calcium oxalate and the calcium oxide, in the carbon shell may be less than 0.01 wt %. In some embodiments of the present disclosure, the anode material includes an node material in which the calcium carbonate and/or calcium oxalate are totally decomposed and the calcium oxide is totally removed.

According to a third aspect of embodiments of the present disclosure, the present disclosure provides an anode material having porous core-shell structure, which is prepared via the method mentioned above.

Description of the anode material having porous core-shell structure is described above, thus repeated description is omitted herein.

According to a fourth aspect of embodiments of the present disclosure, the present disclosure provides a battery, the battery includes a negative electrode containing the anode material having porous core-shell structure mentioned above.

A method of obtaining the negative electrode, for example, may include steps of: mixing the anode material having porous core-shell structure, a negative binder and a negative solvent, coating and/or filling on a negative collector to form a negative material layer on a surface of the negative collector, and drying, rolling or not rolling the negative material layer, to obtain the negative electrode. In some embodiments of the present disclosure, a content of the anode material having porous core-shell structure in the negative material layer is about 80 wt % to about 80 wt %. In some embodiments of the present disclosure, the negative binder may be at least one modified or non-modified binder selected from a group consisting of carboxymethylcellulose (CMC), polyvinylidene fluoride (PVDF), polytetrafluoroethylene (PTFE), polyying akohol (PVA), styrene butadiene rubber (SBR) and polyolefine emulsion. Generally, according to different kind of the negative binder, based on 100 weight parts of the anode material of the present disclosure, a concentration of the negative binder could be 0.01 to about 10 weight parts, for example about 0.02 to 8 weight parts. In some embodiments of the present disclosure, the negative material layer further includes a negative conductive agent, such that a conductivity of the anode material may be improved, the negative conductive agent could be at least one selected from a group consisting of carbon black, nickel powder and copper powder.

In some embodiments of the present disclosure, an active material of positive electrode could be at least one selected from a group consisting of, such as, $LiCoO_2$, $LiVPO_4$, $LiCoAlO_2$, $LiMnCoO_2$, $LiCo_xNi_yMn_zO_2$ (x+y+z=1), $LiMn_2O_4$, $LiNiO_2$ and $LiFe_xM_{1-x}PO_4$ (M could be Co, Ni, Mn, and 0.8≤x≤1).

In some embodiments of the present disclosure, a positive conductive agent of a cathode material could be at least one selected from a group consisting of, such as, carbon black, graphite, acetylene black, carbon fiber, carbon nano tube, carbonyl nickel powder, copper powder, iron powder, zinc powder and aluminum powder. In some embodiments of the present disclosure, based on 100 weight parts of the active material of positive electrode, the positive conductive agent has a content of about 0.5 weight parts to about 15 weight parts, for example, about 1 to about 10 weight parts.

In some embodiments of the present disclosure, a positive binder of the cathode material could be at least one selected from a group consisting of, such as, polyvinylidene fluoride, polytetrafluoroethylene, polyacrylate (containing fluorine), polyurethane (containing fluorine), epoxy resin(containing fluorine), butadiene styrene rubber, polymethylcellulose, polymethylcellulose sodium, hydroxy propyl methyl cellulose, polypropylene glycol, and butadiene styrene rubber (SBR). Generally, according to different kinds of the positive binder, based on 100 weight parts of the active material of positive electrode, a concentration of the positive binder in the cathode material could be about 0.01 weight parts to about 10 weight parts, for example, about 0.02 weight parts to about 7 weight parts.

In some embodiments of the present disclosure, a positive solvent used during preparing the positive electrode could be at least one selected from a group consisting of, such as, N-methyl pyrrolidone, dimethylformamide, formyldiethylamine, dimethyl sulfoxide, tetrahydrofuran and water and alcoholic solvents.

In some embodiments of the present disclosure, the current collector of the positive electrode and the negative electrode could be, such as, aluminum foil, copper foil or punching-hole steel belt.

In some embodiments of the present disclosure, a separator with electrical insulation performance and liquid retention performance is disposed between the positive electrode and the negative electrode. The separator could be any separator that used for a lithium battery, such as polyolefine microporous membrane, polyethylene felt, glass fiber felt or ultra-fine glass fiber paper.

In some embodiments of the present disclosure, a non-aqueous electrolyte of the battery includes a mixing solution of lithium electrolyte salt and non-aqueous solvent. The lithium electrolyte salt could be at least any one selected from a group consisting of lithium Hexafluorophosphate ($LiPF_6$), lithium perchlorate, lithium tetrafluoroborate, lithium hexafluoroarsenate, lithium halide, aluminium chloride acid lithium and lithium fluorocarbon sulfonate. The non-aqueous solvent could be a mixing solution of chain acid ester and cyclic acid ester, the chain acid ester could be at least any one selected from a group consisting of dimethyl carbonate (DMC), diethyl carbonate (DEC), ethyl methyl carbonate (EMC), methyl propyl carbonate (MPC), dipropyl carbonate (DPC) and other chain organic esters which contain fluorine, sulphur or unsaturated bond. The cyclic acid ester could be at least any one selected from a group consisting of ethylene carbonate (EC), propylene carbonate (PC), vinylene carbonate (VC), γ-butyrolactone (γ-BL), sultone and other cyclic organic ester. In some embodiments of the present disclosure, an injected volume of the non-aqueous electrolyte is about 1.5 to about 5.5 g/Ah, and a concentration of the non-aqueous electrolyte is about 0.1 to about 2.0 mol/L.

Since the battery above includes the anode material having porous core-shell structure of the present disclosure, expansion of anode material may be well prevented, such that the battery obtained may have better cycle performance.

Detailed descriptions of the present disclosure will be given below by referring to Embodiment.

A weight ratio of cobalt element, tin element to carbon element of the carbon shell is measured through ICP/AAS, TG-DSC.

A porosity of the carbon shell is measured through BET, mercury intrusion method.

A pore diameter of the carbon shell is measured through BET, SEM.

A thickness of the carbon shell is measured through TG-DSC, TEM.

Embodiment 1

This embodiment is used herein to illustrate the anode material of the present disclosure and its preparation method.

(1) A polyvinylpyrrolidone (5 grams, K-30 purchased from Sinopharm Chemical Reagent Co., Ltd) is added into an aqueous solution of cobalt chloride and stannous mono-sulphate (300 grams, a content of cobalt chloride is 1.8 wt %, a content of stannous mono-sulphate is 4.8 wt %), after stirring solvent, 1 gram of nano calcium carbonate powder (of which particle diameter is 50 nanometers, purchased from Shenzhen Puli chemical Co., LTD, following are the same) and 50 grams of spherical graphite powder (of which particle diameter is 11 μm, NG_21 purchased from Qingdao Taihelong New Energy Materials Co., LTD) are added to form a mixture, and then the mixture is placed in a ball mill tank (a diameter of zirconium ball is 10 millimeters) to perform ball-milling under a speed of 50 rpm so as to obtain a dispersion solution. Then 500 mL aqueous solution of ammonium bicarbonate (a content of ammonium bicarbonate is 16.1 grams) is dropping added via a metering pump for 3 hours into the dispersion solution of which a temperature is maintained at 80 Celsius degrees, and then a solid powder A1 is obtained after suction filtration and drying.

(2) 60 grams of naphthaline is added into a coating pot and then the coating pot is heated to 90 Celsius degrees to dissolve the naphthaline, and then 8 grams of high temperature coal tar pitch (purchased from Shanghai Ding Yang Nai Cai Co., LTD) is added to obtain a naphthaline solution of high temperature coal tar pitch. Then the solid powder A1 is added into the naphthaline solution, and stirred under 90 Celsius degrees for 25 minutes, and then heated to 210 Celsius degrees and maintained for 2 hours, and then heated to 280 Celsius degrees and maintained for 1 hour, and then cooled down to room temperature (about 25 Celsius degrees) to obtain a solid powder B1.

(3) The solid powder B1 is added into an atmosphere oven, and nitrogen is introduced into the atmosphere oven at a rate of 6 $m^3/h$ to expel oxygen, such that an oxygen content is lower than 50 ppm. Then the rate of introducing nitrogen is maintained lower than 0.3 $m^3/h$, the atmosphere oven is heated to 300 Celsius degree with a heating rate of 5 Celsius degrees per minutes and maintained for 2 hours, then heated to 1050 Celsius degree with a heating rate of 10 Celsius degrees per minutes and maintained for 4 hours, and then naturally cooled down to room temperature (about 25 Celsius degrees) to obtain a solid powder C1.

Figure 2:
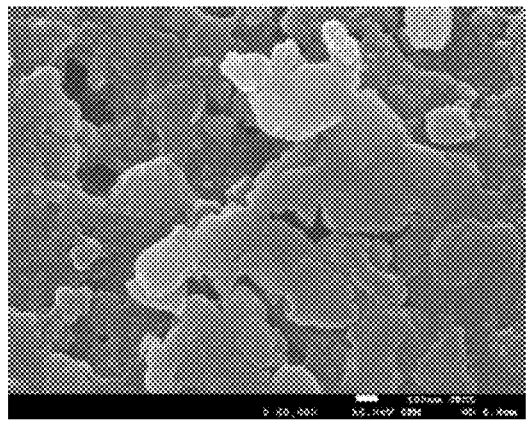
FIG. 2 is a partial enlarged view of a field emission scanning electron micrograph of the anode material obtained in Embodiment 1 of the present disclosure.

(4) The solid powder C1 is washed by deionized water for 3 times (a solid-to-liquid ratio in each time is 1:5), then an anode material having porous core-shell structure CA1 is obtained after filtration and drying. A field emission scanning electron micrograph of the anode material having porous core-shell structure CA1 is shown in FIG. 1 and FIG. 2, in which a particle diameter D50 of the anode material is 12.4 μm, a porosity of the anode material is 15%, a pore diameter is 100 nanometers, a thickness of carbon shell is 1 μm, a weight ratio of carbon element of the carbon shell to the core is 1:10, a weight ratio of cobalt element, tin element to carbon element in the carbon shell is 1:4:4, a particle diameter of cobaltous oxide contained is 30 nanometers, a particle diameter of tin oxide is 50 nanometers, and a particle diameter of tin cobalt alloy is 60 nanometers.

Embodiment 2

This embodiment is used herein to illustrate the anode material of the present disclosure and its preparation method.

The method in Embodiment 2 is similar to that in Embodiment 1, with exceptions that:

The amount of calcium carbonate in step (1) is 0.5 grams.

In step (2), the high temperature coal tar pitch is replaced with 15 grams of glucose, and naphthaline is replaced with 200 mL of deionized water, and 0.3 grams of carbon nano tube (LB200 purchased from Cnano Technology Co., LTD).

In step (3), in the second heating stage, the atmosphere oven is heated to 750 Celsius degrees with a heating rate of 10 Celsius degrees per minutes.

Thus, an anode material having porous core-shell structure CA2 is obtained. A particle diameter D50 of the anode material is 11.8 μm, a porosity of the anode material is 8%, a pore diameter is 80 nanometers, a thickness of carbon shell is 1.2 μm, a weight ratio of carbon element of the carbon shell to the core is 1:10, a weight ratio of cobalt element, tin element to carbon element in the carbon shell is 1:4:4, a particle diameter of cobaltous oxide contained is 30 nanometers, a particle diameter of tin oxide is 40 nanometers, and a particle diameter of tin cobalt alloy is 50 nanometers.

Embodiment 3

This embodiment is used herein to illustrate the anode material of the present disclosure and its preparation method.

The method in Embodiment 3 is similar to that in Embodiment 1, with exceptions that:

The amount of calcium carbonate in step (1) is 2 grams.

In step (2), the high temperature coal tar pitch is replaced with 8 grams of phenolic resin (RS-619 purchased from Shenzhen Puli Chemical Co., LTD), and naphthaline is replaced with 300 mL of absolute ethyl alcohol, and 1.5 grams of acetylene black (V7 purchased from CCBI).

In step (3), in the second heating stage, the atmosphere oven is heated to 900 Celsius degrees with a heating rate of 10 Celsius degrees per minutes.

Thus, an anode material having porous core-shell structure CA3 is obtained. A particle diameter D50 of the anode material is 12.1 μm, a porosity of the anode material is 28%, a pore diameter is 120 nanometers, a thickness of carbon shell is 1.3 μm, a weight ratio of carbon element of the carbon shell to the core is 1:10, a weight ratio of cobalt element, tin element to carbon element in the carbon shell is 1:4:4, a particle diameter of cobaltous oxide contained is 30 nanometers, a particle diameter of tin oxide is 40 nanometers, and a particle diameter of tin cobalt alloy is 50 nanometers.

Embodiment 4

This embodiment is used herein to illustrate the anode material of the present disclosure and its preparation method.

The method in Embodiment 4 is similar to that in Embodiment 1, with exceptions that: the heating process (namely the high temperature decomposition treatment) in step (3) is different, in Embodiment 4, the atmosphere oven is directly heated to 1050 Celsius degrees with a heating rate of 10 Celsius degrees per minutes and maintained for 4 hours.

Thus, an anode material having porous core-shell structure CA4 is obtained. A particle diameter D50 of the anode material is 11.9 μm, a porosity of the anode material is 12%, a pore diameter is 150 nanometers, a thickness of carbon shell is 1.5 μm, a weight ratio of carbon element of the carbon shell to the core is 1:10, a weight ratio of cobalt element, tin element to carbon element in the carbon shell is 1:4:4, a particle diameter of cobaltous oxide contained is 50 nanometers, a particle diameter of tin oxide is 80 nanometers, and a particle diameter of tin cobalt alloy is 70 nanometers.

Comparative Embodiment 1

The method in Comparative Embodiment 1 is similar to that in Embodiment 1, with exceptions that: no calcium carbonate is added, and the high temperature coal tar pitch is replaced with 20 grams of soluble starch. Thus, an anode material CB1 is obtained. A particle diameter D50 of the anode material is 12.1 μm, a porosity of the anode material is 0.5%, a pore diameter is 5 nanometers, a thickness of carbon shell is 0.8 μm, a weight ratio of carbon element of the carbon shell to the core is 1:10, a weight ratio of cobalt element, tin element to carbon element in the carbon shell is 1:2:4, a particle diameter of cobaltous oxide contained is 30 nanometers, a particle diameter of tin oxide is 40 nanometers, and a particle diameter of tin cobalt alloy is 50 nanometers.

Test Embodiment 1

A button battery is prepared respectively with the anode materials of Embodiments 1-4 and Comparative Embodiment 1 via the following method: the anode material, acetylene black, CMC and SBR are mixed evenly and tableted, of which a mass ratio of the anode material, acetylene black, CMC to SBR is 100:2:1.5:2.5, and then a test electrode sheet is obtained after drying at a temperature of 120 Celsius degrees under vacuum for 24 hours. Batteries S1-S4 and DS1 are assembled respectively in a glove box filled with argon, of which a counter electrode is lithium metal piece, separator is celgard2400 porous polypropylene membrane, and an electrolyte is a mixing solution of $LiPF_6$ (1 mol/L), ethylene carbonate (EC) and dimethyl carbonate (DMC) (a weight ratio of EC to DMC is 1:1).

Test Method

An intercalation lithium capacity, de-intercalation lithium capacity, intercalation lithium capacity after cycling for 50 times and de-intercalation lithium capacity after cycling for 50 times are measured through a method of charging and discharging of button batteries.

Mass ratio capacity includes a mass ratio intercalation lithium capacity, and a mass ratio de-intercalation lithium capacity, a calculation method of the mass ratio intercalation lithium capacity and the mass ratio de-intercalation lithium capacity is obtained depending on calculating the intercalation lithium capacity and de-intercalation lithium capacity via using a ratio of measured de-intercalation and intercalation lithium capacity to a content of active material that actually coated on electrode sheet.

The test results are shown in Table 1.

TABLE 1

| Battery | Initial intercalation lithium capacity mAh | Initial de-intercalation lithium capacity mAh | Initial efficiency % | Initial mass ratio intercalation lithium capacity mAh/g | Initial mass ratio de-intercalation lithium capacity mAh/g | Intercalation lithium specific capacity after cycling for 50 times mAh/g | De-intercalation lithium specific capacity after cycling for 50 times mAh/g | Capacity retention ratio after cycling for 50 times % |
|---|---|---|---|---|---|---|---|---|
| S1 | 3.845 | 3.3226 | 86.41 | 438 | 378.49 | 326.09 | 325.12 | 85.9 |
| S2 | 3.8253 | 3.3068 | 86.45 | 424.6 | 367.04 | 325.89 | 325.56 | 88.7 |
| S3 | 3.8446 | 3.3191 | 86.33 | 426.28 | 368.02 | 311.92 | 310.98 | 84.5 |
| S4 | 3.9602 | 3.3369 | 84.26 | 439.57 | 370.38 | 301.21 | 295.19 | 79.7 |
| DS1 | 4.012 | 3.2358 | 80.65 | 445.41 | 359.22 | 248.92 | 246.43 | 68.6 |

Note: The efficiency refers to an efficiency of charging and discharging, which is a percentage of de-intercalation lithium capacity to intercalation lithium capacity. The capacity retention ratio refers to a percentage of de-intercalation lithium mass specific capacity after cycling for 50 times to initial de-intercalation lithium mass specific capacity.

As we can see from Table 1, after cycling for 50 times, the batteries S1-S4 prepared from the anode material having porous core-shell structure of the present disclosure have a minimum intercalation lithium specific capacity of 301.21 mAh/g, and a minimum de-intercalation lithium specific capacity of 295.19 mAh/g, which are much greater than that of DS1 (248.92 mAh/g and 246.43 mAh/g). A maximum capacity retention ratio after cycling for 50 times of the batteries S1-S4 prepared from the anode material having porous core-shell structure of the present disclosure may reach 88.7%. That is, the battery prepared from the anode material having porous core-shell structure of the present disclosure may have a good recycle performance.

Although explanatory embodiments stated above have been shown and described in detail, the present disclosure may not be limited to those details described in these embodiments, various simple modifications could be made within technical spirit and principles of the present disclosure, those simple modifications all fall into the protection scope of the present disclosure.

In addition, it should be noted that, each specific technical feature described in these embodiments stated above, under no contradiction, could be combined via any appropriate manner, in order to avoid unnecessary repetition, various possible combination manners are not illustrated in the present disclosure.

In addition, each different embodiment of the present disclosure could also be combined with each other without departing from spirit and principles of the present disclosure, which should also be deemed as content of present disclosure.

What is claimed is:

1. An anode material having a porous core-shell structure, comprising:
   a core formed of at least one carbonaceous material selected from a group consisting of graphite, hard carbon, and soft carbon; and
   a carbon shell coated on a surface of the core, wherein the carbon shell comprises amorphous carbon, a cobalt element, and a tin element, and the carbon shell is a porous structure that has a plurality of pores and a porosity percentage of a pore volume in a total volume of the carbon shell greater than 10%, and wherein a weight ratio of the cobalt element to the tin element to the amorphous carbon of the carbon shell is about 1:2-4:4-8, the cobalt element and the tin element are presented in the carbon shell in a form of tin cobalt alloy particles, and the tin cobalt alloy particles have a particle diameter of about 30 nanometers to about 70 nanometers.

2. The anode material of claim 1, wherein the carbon shell has a porosity greater than 10% and less than 30%, and a pore diameter of the carbon shell is about 50 nanometers to about 150 nanometers.

3. The anode material of claim 1, wherein a weight ratio of carbon content of the carbon shell to carbon content of the core is about 1-2:10.

4. The anode material of claim 1, wherein the graphite has a particle diameter of about 8 microns to about 18 microns.

5. The anode material of claim 1, wherein the carbon shell further comprises a calcium element and at least one selected from a group consisting of carbon nano tube, acetylene black, and graphene, wherein the calcium element has a content less than 0.01 wt% based on a total weight of the carbon shell.

6. A method of preparing an anode material having a porous core-shell structure, comprising:
   dispersing, at least one selected from a group consisting of calcium carbonate and calcium oxalate, and at least one carbonaceous material selected from a group consisting of graphite, hard carbon and soft carbon, into a first solution to obtain a dispersion solution, wherein the first solution contains cobalt compound and tin compound;

introducing a precipitant into the dispersion solution to carry out precipitation;

obtaining a first solid phase by solid-liquid separation of the precipitated dispersion solution;

dispersing the first solid phase into a second solution containing carbon source material;

obtaining a second solid phase by removing solvent; and treating the second solid phase with a high temperature decomposition treatment in inert atmosphere, wherein the anode material comprises:
- a core formed of the at least one carbonaceous material; and
- a carbon shell coated on a surface of the core, wherein the carbon shell comprises amorphous carbon, a cobalt element, and a tin element, and the carbon shell is a porous structure that has a plurality of pores and a porosity percentage of a pore volume in a total volume of the carbon shell greater than 10%, and wherein a weight ratio of the cobalt element to the tin element to the amorphous carbon of the carbon shell is about 1:2-4:4-8, the cobalt element and the tin element are presented in the carbon shell in a form of tin cobalt alloy particles, and the tin cobalt alloy particles have a particle diameter of about 30 nanometers to about 70 nanometers.

7. The method of claim 6, wherein after the high temperature decomposition treatment, the carbon source material is decomposed into elemental carbon to form a carbon shell on a surface of a core formed of the carbonaceous material, wherein a ratio of the carbon source material and the carbonaceous material is determined by a weight ratio of carbon content of the carbon shell to carbon content of the core, and the weight ratio of carbon content of the carbon shell to carbon content of the core is about 1-2:10.

8. The method of claim 6, wherein the carbon source material is at least one selected from a group consisting of petroleum asphalt, coal pitch, saccharose, glucose, starch, phenolic resin and epoxy resin.

9. The method of claim 6, wherein the cobalt compound is at least one selected from a group consisting of cobalt dichloride, cobalt nitrate, cobaltous sulfate, cobaltous acetate and cobalt oxalate.

10. The method of claim 6, wherein the tin compound is at least one selected from a group consisting of stannous mono-sulphate, stannous chloride, and C1-C4 alkyl sulfonate tin.

11. The method of claim 6, wherein the at least one selected from a group consisting of calcium carbonate and calcium oxalate and the carbonaceous material are dispersed into the first solution with a dispersant, and the dispersant is at least one selected from a group consisting of polyvinylpyrrolidone, polyving alcohol, polyethylene glycol, polyacrylamide and carboxymethylcellulose.

12. The method of claim 6, wherein the precipitant is at least one selected from a group consisting of ammonium bicarbonate, aqua ammonia, carbamide, sodium bicarbonate and potassium bicarbonate.

13. The method of claim 6, wherein the at least one selected from a group consisting of calcium carbonate and calcium oxalate and the carbonaceous material are dispersed into the first solution via ball-milling under a rotate speed of about 50 rpm to about 200 rpm for about 1 hour to about 5 hours.

14. The method of claim 6, wherein the precipitation is carried out under a temperature of about 60 Celsius degrees to about 80 Celsius degrees for about 0.5 hours to about 3 hours.

15. The method of claim 6, wherein the first solid phase is dispersed into the second solution under a temperature of about 80 Celsius degrees to about 100 Celsius degrees for about 0.5 hours to about 1 hour.

16. The method of claim 6, wherein the high temperature decomposition treatment comprises:

heating the second solid phase to about 300 Celsius degrees to about 500 Celsius degrees with a heating rate of about 2 Celsius degrees per minute to about 5 Celsius degrees per minute;

dwelling for about 2 hours to about 4 hours;

heating the second solid phase to about 950 Celsius degrees to about 1050 Celsius degrees with a heating rate of about 5 Celsius degrees per minute to about 10 Celsius degrees per minute; and dwelling for about 3 hours to about 6 hours.

17. The method of claim 6, wherein dispersing the first solid phase into the second solution further comprises introducing an addition agent during the dispersing, and the addition agent is at least one selected from a group consisting of carbon nano tube, acetylene black and graphene.

18. A battery, comprising a negative electrode containing an anode material having a porous core-shell structure, wherein the anode material comprises:
- a core formed of at least one carbonaceous material selected from a group consisting of graphite, hard carbon, and soft carbon; and
- a carbon shell coated on a surface of the core, wherein the carbon shell comprises amorphous carbon, a cobalt element, and a tin element, and the carbon shell is a porous structure that has a plurality of pores and a porosity percentage of a pore volume in a total volume of the carbon shell greater than 10%, and wherein a weight ratio of the cobalt element to the tin element to the amorphous carbon of the carbon shell is about 1:2-4:4-8, the cobalt element and the tin element are presented in the carbon shell in a form of tin cobalt alloy particles, and the tin cobalt alloy particles have a particle diameter of about 30 nanometers to about 70 nanometers.

* * * * *